United States Patent
Kugler

[11] 3,710,624
[45] Jan. 16, 1973

[54] METER VOLUME COMPENSATING MECHANISM

[75] Inventor: Carl J. Kugler, Philadelphia, Pa.
[73] Assignee: The Singer Company, New York, N.Y.
[22] Filed: Dec. 9, 1971
[21] Appl. No.: 206,298

[52] U.S. Cl. ..................................73/233, 73/229
[51] Int. Cl. ............................................G01f 15/04
[58] Field of Search.......73/233, 229, 231 R; 74/190, 74/190.5, 191

[56] References Cited

UNITED STATES PATENTS

| 756,365 | 4/1904 | Hoffman | 73/233 |
| 1,881,572 | 10/1932 | Herz | 73/233 |
| 2,826,925 | 3/1958 | Singer | 74/191 X |
| 3,073,157 | 1/1963 | Gehre | 73/233 X |

Primary Examiner—Richard C. Queisser
Assistant Examiner—John P. Beauchamp
Attorney—Marshall J. Breen et al.

[57] ABSTRACT

A meter volume compensating mechanism having a frustrum with three angles on the surface thereof. The meter volume compensating mechanism includes a temperature sensor, the expansion of which varies nonlinearly between different ranges of temperature; for example: having one rate of expansion above 50°F and another rate of expansion below 50°F. The three-surfaced frustrum approximates a curved surface and offsets the nonlinear expansion of the sensor, permitting the corrected flow measurement to be within plus or minus one percent (1 percent).

7 Claims, 12 Drawing Figures

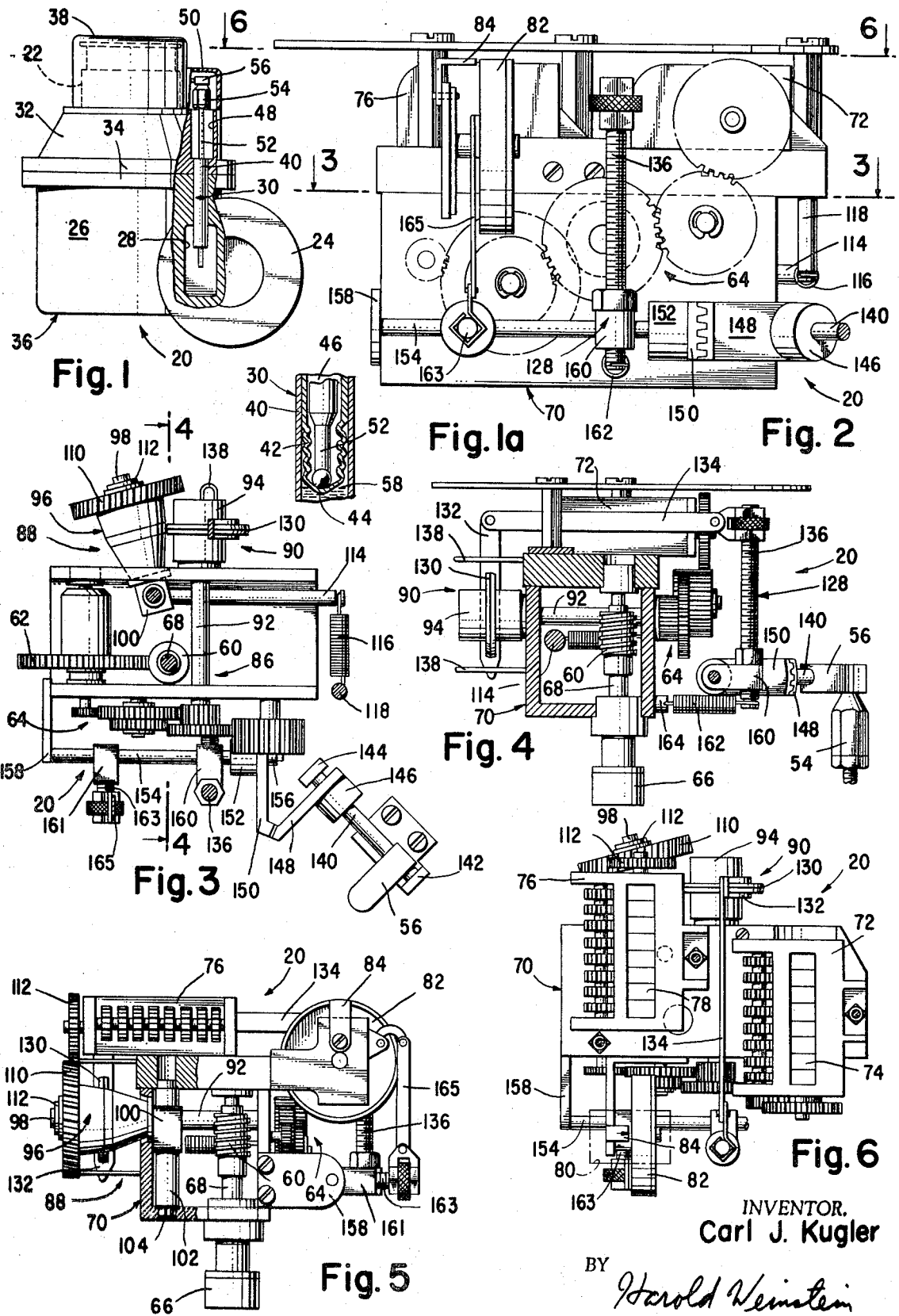

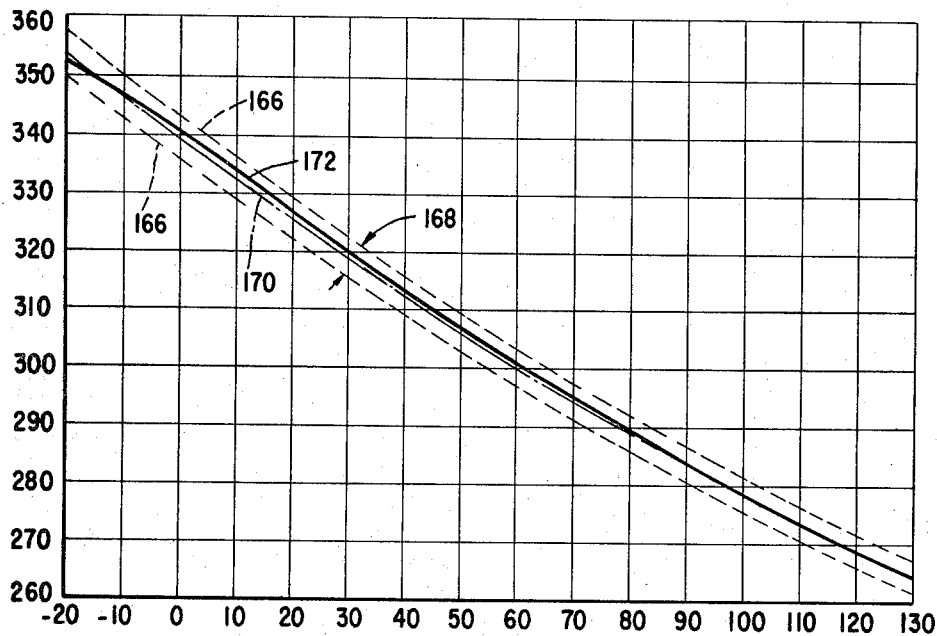
Fig. 7
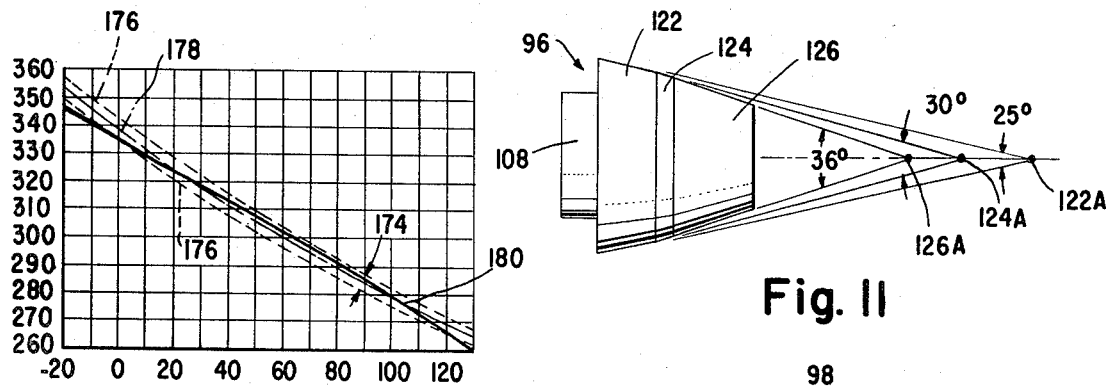
Fig. 8
Fig. 11
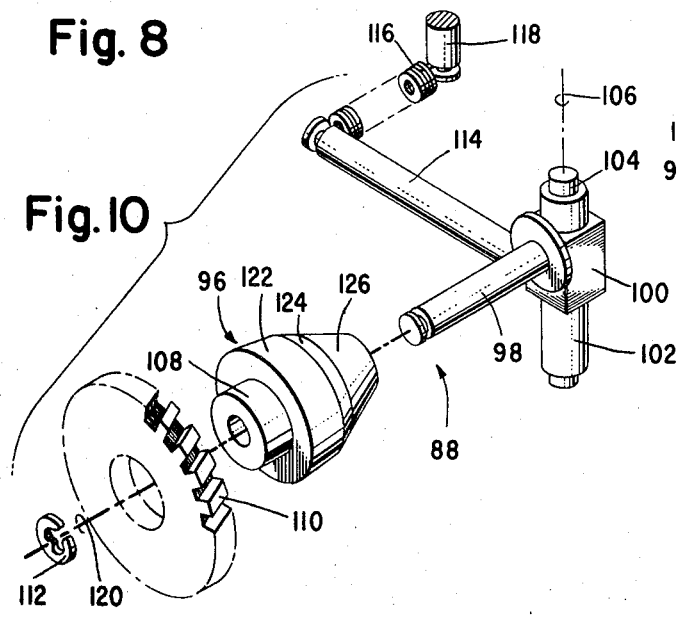
Fig. 10
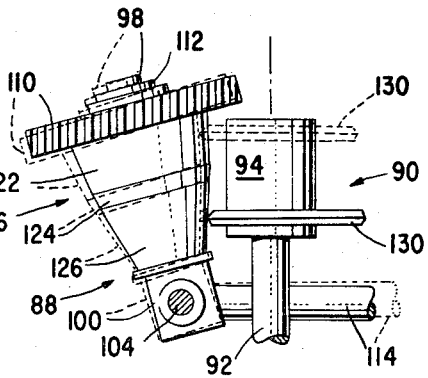
Fig. 9
INVENTOR.
Carl J. Kugler
BY Harold Weinstein
ATTORNEY 3,710,624

METER VOLUME COMPENSATING MECHANISM

BACKGROUND OF THE INVENTION

Compensators in the prior art have used a frustrum cylinder or drum having either a single straight surface which is simple but inaccurate, or a curved surface which is complex and costly though more accurate. Most temperature sensors have nonlinear expansion; therefore, it was necessary to tolerate the inaccuracy produced in a straight compensating mechanism or go to the expense of machining a special curve for each particular adaptation of the compensator.

SUMMARY OF THE INVENTION

It is therefore an object of the present invention to provide a novel meter compensating mechanism which overcomes the prior art disadvantages; which is simple, economical and accurate; which uses a driven output member, the surface of which is formed at a plurality of angles calculated to very corresponding to the nonlinear expansion of the temperature sensor; which uses a driven output member in the shape of a cone frustrum having a plurality of angled surfaces; and which uses a cone frustrum driven member having three angles on the surface thereof.

BRIEF DESCRIPTION OF THE DRAWINGS

This invention is illustrated in the accompanying drawings in which:

FIG. 1 is an elevational view, partly in section, of a meter in which the present invention is embodied.

FIG. 1a is an enlarged portion of the temperature sensor shown encircled in FIG. 1.

FIG. 2 is an elevational view of one side of the compensating mechanism.

FIG. 3 is a view taken along line 3—3 of FIG. 2.

FIG. 4 is a view taken along line 4—4 of FIG. 3.

FIG. 5 is an elevational view of another side of the compensating mechanism showing the cone frustrum.

FIG. 6 is a view taken along line 6—6 of FIG. 2.

FIG. 7 is a graphic representation of a curve showing the corrected counts of the throughput flow of a meter having the novel compensating mechanism of the present invention, wherein said curve remains wholly within the acceptable percentage error.

FIG. 8 is a graphic representation of a curve showing the corrected counts of the throughput flow of a meter having a prior art compensating mechanism using a single straight surface conical frustrum, wherein said curve exceeds the maximum acceptable percentage error at either end thereof.

FIG. 9 is a top plan view of the compensating mechanism which will correct the count rate when the temperature of the throughput flow changes, showing the extremes of travel of the ring upon the cone frustrum.

FIG. 10 is an exploded perspective view of the improved cone frustrum of the novel compensating mechanism.

FIG. 11 is a plan view of the cone frustrum showing the three conical sections thereof.

DESCRIPTION OF THE INVENTION

In the preferred embodiment of the invention illustrated in FIGS. 1 and 2, a conventional positive displacement meter 20 is provided with a novel volume compensating mechanism 22. The present volume compensating mechanism 22 is an improved version of the type compensator shown in U.S. Pat. No. 2,889,713. The volume compensating mechanism 22 continuously compensates for changes in one of the characteristics of the fluid flowing the meter 20, which in the present instance, is the temperature characteristic. This compensation is necessary because the fluid, such as a gas, is normally sold in units of a standard cubic foot. Assuming the pressure to be constant, a standard temperature is established, usually 60°F. Charles' Law states that the volume of any definite weight of gas under constant pressure increases proportionately as the absolute temperature increases and decreases proportionately as the absolute temperature decreases. Therefore, the volume compensating mechanism 22 will make a continuous compensation for changes in temperature occurring during the measurement of the volume of gas passing through the meter 20. The volume compensating mechanism 22 is designed to compensate for gas temperatures ranging from −20°F to +140°F.

The meter 20 illustrated in FIG. 1 can be a rotary meter, a turbine meter, or other type meter used for measuring the amount of fluid, such as a gas, flowing through the meter 20 from an inlet (not shown) to an outlet 24. The meter 20 has a cylindrical portion 26 having a chamber means 28 formed therein, a portion of which is shown in FIG. 1 in communication with the inlet and outlet 24, and wherein a suitable impeller or rotatable means (not shown) is driven by the gas throughput flow. A temperature sensor 30 is mounted in the meter 20 and extends into the chamber 28 so as to be exposed to the mainstream of the throughput flow of the gas. An end bell 32 is suitably joined to the cylindrical portion 26 by connecting flanges as at 34 to define a meter housing 36. A cover 38 encloses the upper end of the end bell 32 and is connected thereto by suitable securing means.

The temperature sensor 30 shown in FIGS. 1 and 1a has a casing 40 in which a bellows 42 is affixed to the inner periphery intermediate the ends of the casing 40 to divide said casing into a sealed lower chamber 44 and an open upper chamber 46. The diameter of the bellows 42 is slightly less than the diameter of the inner periphery of the casing 40, to provide a small clearance therebetween and to permit free movement of the bellows therein. The top of the upper chamber 46 is open and terminates at the base of an aperture 48 formed in the end bell 32 to communicate with the space enclosed by the cover 38. The cover 38 is substantially circular with a projection 50 on one side thereof in superposition to the aperture 48 and enclosing the same as shown in FIG. 1. An actuator rod 52 having an enlarged head 54 is connected for friction-free movement between the bottom of the bellows 42 and a biasing arm 56. The lower chamber 44 is filled with a thermally expansible liquid 58 which will change volume responsive to the temperature fluctuation of the gas throughput flow in the meter 20, so as to cause the actuator rod 52 to move upwardly or downwardly corresponding to the change in volume of said liquid. In theory, the movement of the actuator rod 52 should be exactly linear corresponding to temperature changes. However, the liquid in the lower chamber 44 changes volume in a nonlinear manner as follows:

Between −50°F to +50°F the expansion equals 0.00021 inches per degree.

Between +50°F to +150°F the expansion equals 0.00025 inches per degree. Accordingly, for the corrected volume of throughput flow to remain within a predetermined percentage error of, say 1 percent, it is necessary for the volume compensating mechanism 22 to also compensate for the nonlinear expansion of the sensor 30.

As in conventional meters, the rotation of the impeller will directly drive a worm 60 and gear 62 of a gear train 64 through a magnetic coupling, only the upper magnet 66 of which is shown in FIG. 4. The worm 60 is affixed to a vertical shaft 68, the lower end of which, carries the upper magnet 66. The shaft 68 is journaled in a frame 70 mounted atop the end bell 32 and enclosed by the cover 38. A register 72 is driven from the gear train 64 and acts as an "uncorrected counter" to accumulate and indicate the total volume of gas, uncorrected for temperature variation, in the window 74 as measured by the meter 20 and illustrated in FIG. 6. The volume compensating or integrating mechanism 22 makes a continuous compensation for changes in temperature occurring during the measurement of the volume of the gas by the meter 20 and drives a "corrected counter" as at register 76, which indicates the corrected total volume of gas in a window 78. The temperature of the gas flowing through the meter 20 is also shown in FIG. 6 in a window 80, by a temperature dial 82 and indicator 84, illustrated in FIGS. 2, 5 and 6, which is positioned responsive to the compensating mechanism 22, as signaled by the temperature sensor 30.

The volume compensating or integrating mechanism 22 includes an input assembly 86, an output assembly 88 and a ring assembly 90.

The input assembly 86 has a fixed axis shaft or driving member 92 journaled in spaced-apart vertical walls of the frame 70, and having one end affixed to an intermediate gear of the gear train 64 to be driven thereby, and the opposite end extending outwardly from one of the vertical walls having an enlarged roller 94 affixed thereto, as illustrated in FIGS. 3 and 4.

The output assembly 88 is illustrated in FIGS. 3 and 10 includes a driven member or cone frustrum 96, journaled on a stub shaft 98 affixed within a block 100 carried on a sleeve 102 pivotally disposed upon a post 104. The post 104 is vertically journaled in spaced-apart horizontal walls of the frame 70, as illustrated in FIG. 5 wherein the sleeve 102 and connected cone frustrum 96 is free to pivot about the axis 106 of the post 104. The end of the cone frustrum remote from the post 104 has a hub 108 to which is affixed a gear 110 which in turn will drive a gear 112 of the register 76. The cone frustrum 96 is rotatably mounted on the stub shaft 98 and maintained thereon by a spring clip 112 affixed to the shaft 98 adjacent the hub 108. A biasing shaft 114 has one end affixed to the block 100 in perpendicular relationship to the stub shaft 98 to extend under the driving shaft 92 as shown in FIG. 3, with the free outer end connected to a spring 116 connected between the shaft 114 and a stake 118 to bias the cone frustrum 96, in the direction of the roller 94. The cone frustrum 96 is free to rotate about the axis 120 of the shaft 98.

The cone frustrum 96 as best seen in FIGS. 10 and 11 has three angled surfaces or conical sections 122, 124 and 126. The tapers and axial lengths of the respective sections 122, 124 and 126, were empirically derived to offset the nonlinearity in the expansion of the temperature sensor 30, and approximate a curved surface. The conical sections are tapered in successively increasing angles in the direction of the smallest diameter of the frustrum, whereby the section 126 is set off at an angle from its projected apex 126A of 36°; the section 124 has an angle at its projected apex 124A of 30°; and, the section 122 has an angle at its projected apex 122A of 25°. The axial lengths of the sections assuming the conical sections of the cone frustrum 96 have a combined axial length of 0.638 inches, the axial length of section 122 is 0.242 inches; the axial length of section 124 is 0.070 inches; and the axial length of section 126 is 0.326. The largest diameter of the frustrm 96 occurs at the outer end of section 122 adjacent the hub 108 and is 0.757 inches.

The ring assembly 90 includes a linkage assembly 128 and a ring 130. The ring 130 encircles the roller 94 and is clamped between the roller 94 and the cone frustrum 96 by the loading of spring 116. In this manner, the motion transferred from roller 94 to frustrum 96 will be completely by friction. The ring 130 is guided by a yoke 132 which is controlled by a link 134 attached to an adjustable link 136 of the link assembly 128. As the temperature varies, the adjustable link 136 will be positioned as described more fully hereinafter, whereby any change in position will move the link 134 and cause the yoke 132 to steer the ring 130 in the manner of a front wheel of a bicycle. As soon as the ring 130 is tilted, it attempts to straighten itself in line with the yoke which is guided between the two U-shaped fixed guides 138, as seen in FIG. 4. Accordingly, as the temperature varies, the position of the ring 130 in relation to the cone frustrum 96 will change proportionately. The ratio of the diameters of the roller 94, the cone frustrum 96 and the ring 130 is so calculated, that when the ring 130 is positioned by the yoke 132 at the base temperature of 60°F, the cone frustrum 96 will make exactly one full turn for each full turn of the roller 94. In addition to the yoke 132 and the links 134 and 136, the linkage assembly 128 includes the biasing arm 56 and the interconnecting components set forth hereinafter. The linkage assembly 128 serves the dual function of biasing the actuator rod 52 of the temperature sensor 30 into operative position, and of signalling the temperature changes responsive to the positioning of the actuator rod 52 to the ring 130 to position the same upon the cone frustrum 96, so as to properly compensate for the temperature changes in the volume measurement as reflected in the corrected counter or register 76. The linear motion of the actuator rod 52 is transmitted to one end of the biasing arm 56 as seen in FIGS. 3 and 4, the other end of which is fixedly connected to a shaft 140, horizontally mounted in spaced bearings 142 and 144. A hub 146 of a bevelled miter gear 148 is fixedly connected to the shaft 140 inwardly of the bearing 144. A bevelled miter gear 150 mates with gear 148 and has a hub 152 fixedly connected to a horizontal shaft 154. The shaft 154 is mounted in spaced bearings 156 and 158 of the frame 70. A bracket arm 160 is fixedly connected to the shaft 154, and has adjustable link 136 threadedly connected to its outer end so as to lie on the same side of the shaft 154 as does the biasing arm 56. The lower end of the link 136 extends below the bracket arm 160, and has one end of a spring 162 shown in FIGS. 2 and 4 connected thereto. The spring 162 has its other end staked as at 164 into a wall of the frame 70. The spring 162 extends transversely below the shaft 154 and biases the vertically disposed adjustable link 136 to pivot clockwise about the axis of the shaft 154 as shown in FIG. 4, and through the connecting gears 148 and 150, likewise biases the arm 56 to pivot clockwise about the shaft 140. In this manner the arm 56 remains in continuous contact with the actuator rod 52. As described hereinbefore, any movement of the adjustable link 136 will be transmitted through the link 134 and yoke 132 to the ring 130 to reposition the same upon the cone frustrum 96. A bracket arm 161 is fixedly connected to the shaft 154, and carries an adjustable arm 163 and a fixed arm 165 connected to turn the temperature dial 82 corresponding to changes in temperature as signaled by the turning of the shaft 154 responsive to expansion or contraction of the temperature sensor 30.

FIG. 9 is a dramatization showing the extreme positions of the ring 130 upon the cone frustrum 96, wherein assuming the initial gas temperature to be extremely low, say −20°F, the ring 130 will be as represented by the solid line located upon the cone frustrum 96 on the conical section 126 at a small diameter thereof so as to result in a greater number of revolutions of the cone frustrum 96. Assuming the temperature goes to the other extreme and becomes much higher, say +130°F, the yoke 132 or the linkage assembly 128 will effect repositioning of the ring 130, as represented by the dotted ring, upon the conical section 122 at the larger diameter thereof, resulting in a smaller number of revolutions of the cone frustrum 96. While the yoke 132 motion is linear, the output value caused by the rotation of the cone frustrum 96 is nonlinear (a reciprocal function) which is the precise volume compensation required for temperature changes. Thus, Charles' Law is mechanically duplicated. In normal operation, when no temperature changes are occurring, the ring 130 will run in a straight, untilted position. As seen in FIG. 9, movement of the ring 130 along the axis of the roller 94 will cause the cone frustrum 96 to pivot about the axis 106 of the post 104 so as to continuously maintain contact with the ring 130 and clamp the same against the roller 94 whereby motion from the roller 94 is transmitted through the ring 130 to the cone frustrum 96.

FIG. 7 is a graphic representation in which the vertical lines represent temperature increments of 10°F, covering a range of −20°F to +130°F. The horizontal lines represent steps of ten counts each, covering a range of 260 counts to 360 counts. These numbers are convenient because of the calibration procedures used, wherein the base temperature is 60°F. When a probe is inserted into an exact 60°F reference bath and the meter accumulates exactly 300 counts on the uncorrected counter, then the corrected counter should also generate exactly 300 counts. Any deviation would be an error, the size depending on the number of counts. Plus or minus three counts would equal plus or minus 1 percent error, which is represented by the upper and lower dashed lines 166 defining a tolerance band 168.

The dot-dash line 170 within the center of the band 168 represents a perfectly measured flow with zero deviation. The solid line represents the corrected counts of the throughput low of the meter 20 using the novel cone frustrum 96 having the three conical sections 122, 124, and 126, wherein the curve 172 remains wholly within the acceptable percentage error of less than plus or minus 1 percent, over the full range of anticipated temperatures.

The graph shown in FIG. 8 is a similar, though somewhat smaller representation of the temperature and count increments shown in FIG. 7. A tolerance band 174 is formed between a plus and minus 1 percent dashed error line 176, in the center of which is a dot-dash zero error line 178. The solid line curve 180 of FIG. 8 shows the corrected count of the throughput flow of a meter having a prior art compensating mechanism using a single straight surface conical frustrum that results in the curve not staying within the tolerance band, dropping out at both ends.

Use of the novel cone frustrum 96 having the three conical sections 122, 124, and 126, the shape of which was developed empirically, it is apparent that the measurement of the throughput flow in meter 20 remains at all times within the tolerance band 168 as indicated by the graphic representation of the curve 172 illustrated in FIG. 7.

It will be understood that various changes in the details, materials, arrangements of parts and operating conditions which have been herein described and illustrated in order to explain the nature of the invention, may be made by those skilled in the art within the principles and scope of the invention.

Having set forth the nature of the invention, what is claimed herein is:

1. A volume compensating mechanism for correcting the volume of the throughput fluid flow of a meter comprising:
   a. a driving member connected in the meter to be driven by the throughput flow,
   b. the driving member having a fixed axis,
   c. a driven member mounted adjacent to and biased in the direction of the driving member,
   d. a ring clamped between the driving member and the driven member to transmit rotary motion from the driving member to the driven member,
   e. a sensor mounted in the meter to sense changes in one of the characteristics of the fluid flowing therethrough,
   f. the sensor having a nonlinear rate of change responsive to changes in the said fluid characteristic,
   g. linkage means connected between the sensor and the ring to continuously cause the ring to shift position between said members responsive to the rate of change of the sensor,
   h. one of said members having a cylindrical shape, and
   i. the other of said members formed in the shape of a cone frustrum having a plurality of angled surfaces upon which the ring will travel to compensate for the nonlinear rate of change of the sensor.

2. The combination claimed in claim 1 wherein:
   a. the sensor is a temperature sensor which expands and contracts in a nonlinear manner, and b. the driven member defines a cone frustrum having a plurality of angled straight surfaces configured to compensate for the nonlinear expansion and contraction of the temperature sensor.

3. The combination claimed in Claim 2 wherein:
   a. the cone frustrum has three angled straight surfaces of successively increasing angles in the direction of the smaller diameter of the frustrum.

4. The combination claimed in Claim 2 wherein:
   a. the cone frustrum has three conical sections of successively increasing taper along the axial length thereof.

5. The combination claimed in Claim 4 wherein:
   a. the intermediate conical section is of smaller axial length than the conical sections at either end of the cone frustrum.

6. A volume compensating mechanism for correcting the volume of the throughput fluid flow of a meter comprising:
   a. a drive means rotatively connected to be rotated by the meter,
   b. the drive means including a gear train, the last gear of which drives a fixed axis shaft having a roller affixed thereto,
   c. a ring encircling the roller,
   d. a linkage means engaging the ring to shift the same along the axial length of the roller,
   e. a temperature sensor having a nonlinear temperature change rate connected to the linkage means to shift the linkage means and ring responsive to changes in the temperature from a predetermined standard value,
   f. a cone frustrum having an axis pivotal about a predetermined point, which point passes through the plane in which the axis of the roller lies,
   g. a spring connected to the cone frustrum to bias the same in the direction of the roller and to clamp the ring between the roller and the cone frustrum to be driven thereby,
   h. the cone frustrum having a plurality of conical sections of varying tapers to compensate for the nonlinear temperature change rate of the temperature sensor, and
   i. a register connected to be driven by the cone frustrum to indicate the corrected volume of fluid flow passing through the meter.

7. The combination claimed in Claim 6 wherein:
   a. the cone frustrum is sized to make one revolution when the ring is positioned at a predetermined axial location thereon, corresponding to the temperature of the fluid being at the predetermined standard value,
   b. the ring is shifted to a smaller diameter portion of the cone frustrum responsive to the temperature of the fluid being at a value below said standard, and
   c. the ring is shifted to a larger diameter portion of the cone frustrum responsive to the temperature of the fluid being at a value above said standard.

* * * * *